US012761158B2

(12) United States Patent
Thurin et al.

(10) Patent No.: US 12,761,158 B2
(45) Date of Patent: Oct. 13, 2026

(54) LIGHTING FOR AN OPTICAL MONITORING APPARATUS

(71) Applicant: BÜHLER UK LTD., London (GB)

(72) Inventors: Brice Thurin, London (GB); Timothy Kelf, Chelmsford (GB); Nicholas London, Chelmsford (GB); Desmond Pereira, Norbury (GB)

(73) Assignee: BÜHLER UK LTD., London (GB)

( * ) Notice: Subject to any disclaimer, the term of this patent is extended or adjusted under 35 U.S.C. 154(b) by 91 days.

(21) Appl. No.: 18/846,510

(22) PCT Filed: Mar. 9, 2023

(86) PCT No.: PCT/EP2023/025111
§ 371 (c)(1),
(2) Date: Sep. 12, 2024

(87) PCT Pub. No.: WO2023/174579
PCT Pub. Date: Sep. 21, 2023

(65) Prior Publication Data
US 2025/0208055 A1 Jun. 26, 2025

(30) Foreign Application Priority Data
Mar. 14, 2022 (EP) .................................... 22161913

(51) Int. Cl.
*G01N 21/88* (2006.01)
*B07C 5/342* (2006.01)
*G01N 21/85* (2006.01)

(52) U.S. Cl.
CPC ......... *G01N 21/8806* (2013.01); *B07C 5/342* (2013.01); *G01N 21/85* (2013.01); *G01N 21/8851* (2013.01); *G01N 2021/8819* (2013.01); *G01N 2021/8841* (2013.01)

(58) Field of Classification Search
CPC ............... G01N 21/8806; G01N 21/85; G01N 21/8851; G01N 2021/8819; G01N 2021/8841; B07C 5/342
See application file for complete search history.

(56) References Cited

U.S. PATENT DOCUMENTS

| | | | |
|---|---|---|---|
| 6,225,620 | B1 | 5/2001 | Campbell et al. |
| 10,928,328 | B2 | 2/2021 | Deefholts et al. |
| 2019/0025224 | A1 | 1/2019 | Deefholts et al. |

FOREIGN PATENT DOCUMENTS

| | | | | |
|---|---|---|---|---|
| CN | 107 894 690 A | 4/2018 | | |
| DE | 000019816881 A1 * | 10/1999 | ............. G01N 21/85 | |
| EP | 3 736 550 A1 | 11/2020 | | |
| EP | 3 761 011 A1 | 1/2021 | | |

* cited by examiner

*Primary Examiner* — Georgia Y Epps
*Assistant Examiner* — Don J Williams
(74) *Attorney, Agent, or Firm* — Colson Law Group, PLLC

(57) ABSTRACT

An optical monitoring apparatus and method. The apparatus comprises an imaging device for monitoring material continuously moving through a defined imaging area. The apparatus further comprises a lighting unit comprising a source of light and a concave freeform reflector configured for reflection of light from the source of light in three dimensions to provide uniform illumination across the defined imaging area.

15 Claims, 8 Drawing Sheets

LIGHTING FOR AN OPTICAL MONITORING APPARATUS

This disclosure relates to apparatus and methods for producing lighting, and more particularly producing lighting for imaging apparatuses used for optical monitoring of materials in industrial processes.

An industrial process can involve processing of large quantities of materials flowing through the process. Constant monitoring of materials may be required at various stages of the process. Monitoring can be provided for various reasons and can be applied to various materials. Non-limiting example of materials include food substances, for example grains, pulses, nuts, fruit, vegetables and so on, polymeric materials, metallic materials and wooden materials, mixed materials, waste materials, and any other physical matter that flows in a process. Monitoring can be provided for the purposes of sorting materials and/or analysing materials. In this specification the term sorting covers a wide variety of material handling tasks that can be performed based on monitoring. For example, the sorting can cover any kinds of inspection, grading or categorisation, quality control, detection of defects, various analyses of materials, measurements such as measuring volume, quantity, moisture, and separation between organic and inorganic materials, for example when processing waste. Other property related parameters may also be monitored, e.g., colour, polymer type, damaged items and so on. There are numerous uses of sorting and the above examples are not presented as an exhaustive list of sorting applications. Material analysing applications provide information, for example quality analysis and reports, of the monitored material.

Monitoring of materials can be performed by specific equipment configured for the tasks of sorting and analysis of bulk material. Optical equipment can be used for the monitoring. The monitoring may be provided based on signals from imaging apparatus, such as digital cameras or scanners, optical readers and so on imaging equipment. Signals from the imaging apparatus can be input into a data processing apparatus for analysis. Appropriate process control actions may be taken based on the analysis.

Optical equipment may require use of high-power broadband visible and infrared lighting. Currently the main types of light sources comprise incandescent halogen light bulbs and LEDs (Light Emitting Diodes). Similar to most light sources incandescent halogen light bulbs have isotropic emission. Optical sorters in turn use, e.g., linescan cameras with a viewing or imaging field/area that is typically less than a couple millimetres wide and can be hundreds of millimetres long. To produce high enough irradiance at the imaging area of linescan cameras, cylindrical concentrating reflectors have been used. An example of a cylindrical co-linear reflector is disclosed in U.S. patent Ser. No. 10/928,328B2. Cylindrical reflectors focus light in one direction along the line of the imaged strip-like area. Concentrating cylindrical reflectors have reduced the amount of energy required for the lighting but a significant amount of electrical and optical power may still be needed to produce adequate lighting. Energy can also be wasted as heat. Heat may cause problem to the monitored materials and environment and/or health and safety issues. Multiple bulbs have been used to increase the light level on the line, but as camera systems with higher resolution are appearing these require even higher optical power.

The low optical efficiency of current systems may be particularly problematic in applications where the cost of optical power is high per inspected volumes of material. Applications requiring very high optical power due to the spectral band of the detection being narrow may also be problematic. Also, performance and signal to noise may be compromised if operating at lower light level than what this should be. Especially in the infrared region, cameras can be only around 20% of their saturation level. The possible dynamic range of the detection system may be limited by the insufficient uniformity of light by the current systems.

Some of the wasted light can also affect the noise level in the monitoring system through stray light, reflection, and scattering. Any additional optical power and spurious light may also be a potential health and safety hazard. A specific example of applications is multimodule sorting machines where the foreground lighting can be modular. In such applications crosstalk can become a problem.

The herein described aspects aim to address at least some of these issues.

According to an aspect, there is provided an optical monitoring apparatus, the apparatus comprising an imaging device for monitoring of material continuously moving through a defined imaging area, and a lighting unit comprising at least one source of light and a concave freeform reflector configured for reflection of light from the at least one source of light in three dimensions to provide uniform illumination across the defined imaging area.

In accordance with another aspect there is provided a method for optical monitoring of material, the method comprising imaging material flowing through a defined imaging area by a digital imaging device, emitting light from at least one source of light, and reflecting the light in three dimensions by a concave freeform reflector such that uniform illumination is provided across the defined imaging area.

In accordance with a more specific aspect the concave reflector is shaped to reflect the illumination on the imaging area such that the imaging device provides uniform response with optimised efficiency.

The width of the illumination area may be less or equal to 50 mm for an illumination distance in the range of 150 mm to 1200 mm. The length of the illumination area may be in the range of 150 mm to 600 mm. Width to length ratio of the illumination area can be in the rage of about 1:10 to 1:60.

The concave reflector can be shaped to provide a sharp cut-off of the illumination at each extremity of the imaging area.

The apparatus may comprise at least two lighting units and associated imaging areas. At least one concave reflector of a lighting unit can be shaped to control illumination crosstalk with an adjacent imaging area.

The apparatus may also comprise at least two lighting units per an imaging area. The concave reflectors of the at least two lighting units can be shaped so that the sum of the illumination from the reflectors of the at least two lighting units produce uniform irradiance or uniform response of the imaging device on the imaging area.

The apparatus may be configured for monitoring of bulk material moving through the defined imaging area.

The illumination may be directed to material guided by a chute or a conveyor. The material can be bulk material.

The apparatus may comprise a sorting and/or analysing apparatus.

A computer software product may be used for designing and producing the herein described reflector component.

Some aspects will now be described in further detail, by way of example only, with reference to the following examples and accompanying drawings, in which.

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Figure 1:
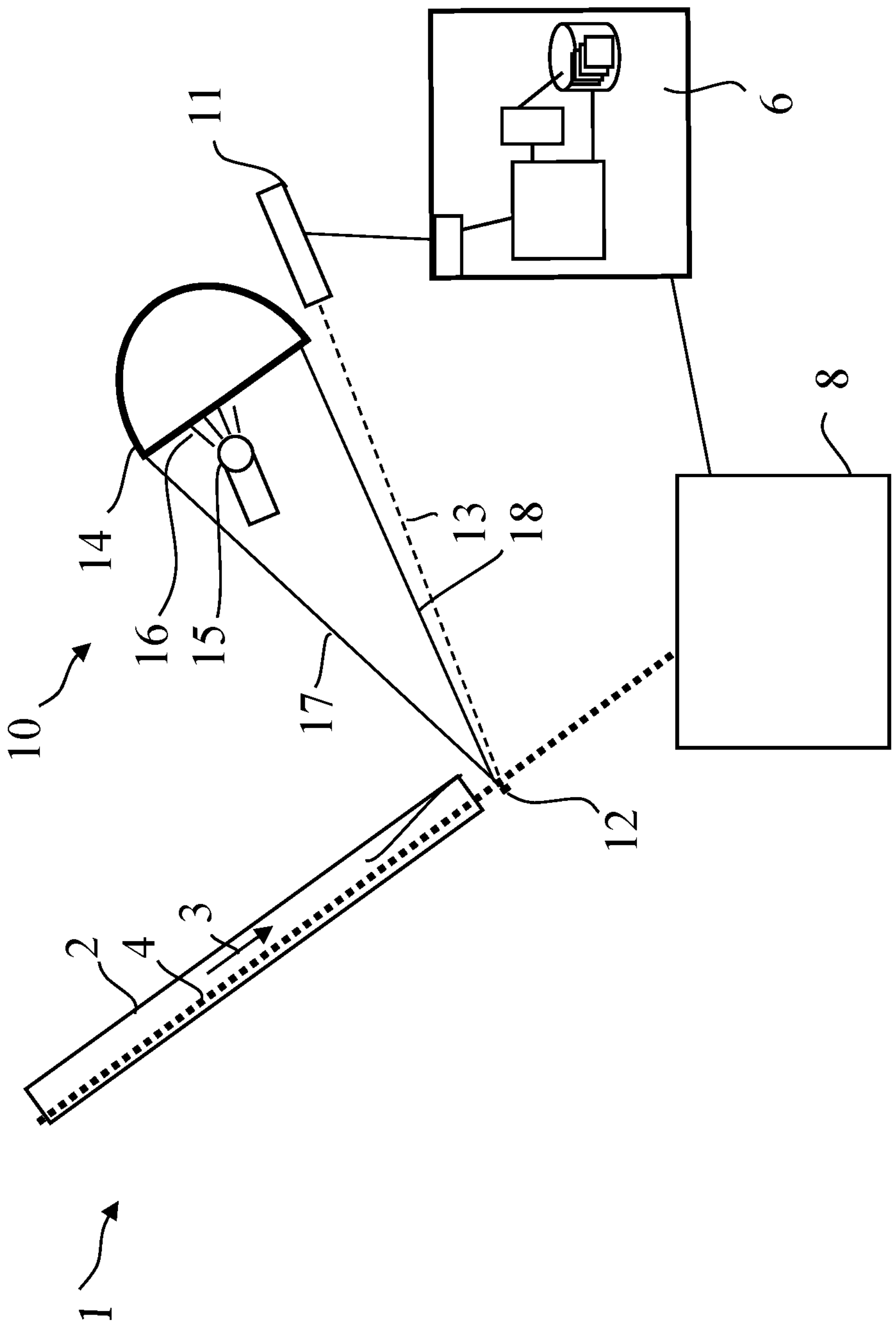
FIGS. 1 and 2 illustrate side and plan views of a schematic example of a system comprising an optical monitoring apparatus.
Figure 2:
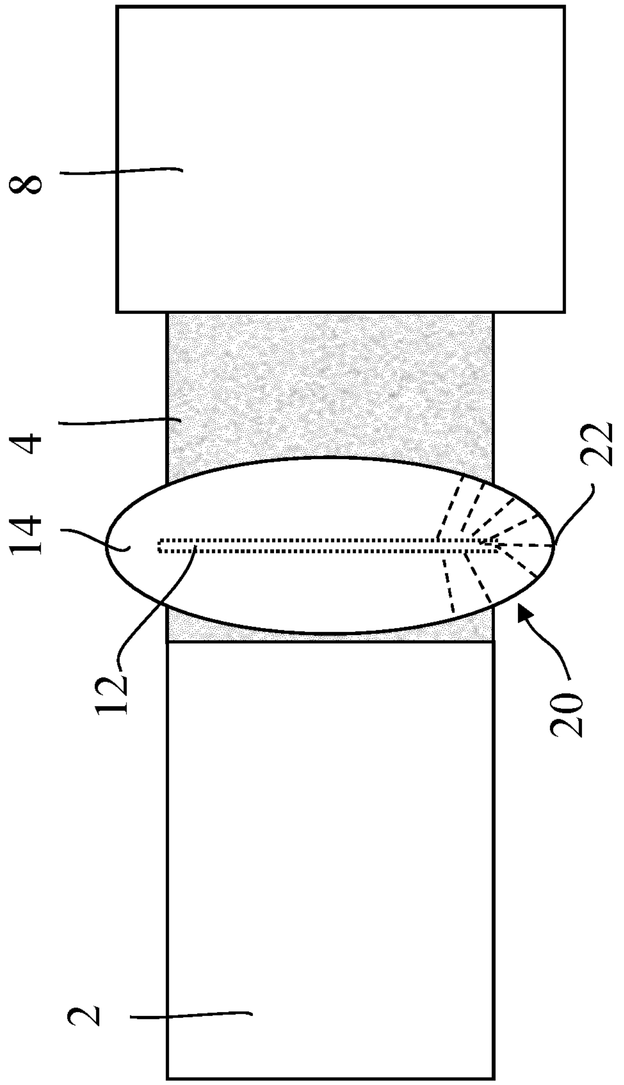

FIG. 1 shows a side view of a schematic example of a processing system 1 provided with monitoring apparatus 10. FIG. 2 shows a plan view of a processing system. The processing system 1 comprises a chute 2 guiding material 4 flowing through the system as indicated by arrow 3. The chute 2 guides the downwards moving material 4 towards a material processing apparatus 8. Instead of, or in addition to a chute, the processing system may comprise a conveyor or other apparatus effecting flow of material in the system.

The material processing apparatus is controlled by a controller system comprising a data processing apparatus 6. The material processing apparatus may process the material in various manners. For example, the material may be subjected to quality analysis and/or control actions where the material can be accepted/rejected by appropriate sorting equipment based on detection of impurities, misshaped objects, variations, and so on. Other non-limiting examples include grading or categorisation of materials where different grades or varieties of material are separated based on control instruction from the control system. For example, food material or waste material may be divided into different material streams by the material processing apparatus 8 configured for sorting the material.

The monitoring apparatus 10 comprises an imaging device, for example a digital camera 11, configured for imaging an imaging area 12. In this example the imaging area extend across the width of the material flow between the end of the chute 2 and the following processing apparatus 8. The material can fall freely between the end of the chute and the subsequent processing apparatus such as a sorter. The term imaging area is used in this specification to refer to the field of view of the camera on the imaging plane. In line scan applications the imaging area is provided as a substantially narrow strip. This enables imaging for line scan applications and taking of direct 2D images of the imaging area extending across the width of the material falling out from the chute.

The line of sight from the camera to the imaging area 12 is denoted by the dashed line 13. The imaging or viewing area 12 of the example is a narrow strip extending over the width of the material emerging from the chute 2 and the camera 11 is configured to image the entire length of the imaging area so that all material 4 passing the monitoring apparatus 10 is imaged. The image captured by the optics of the camera is converted into a digital signal for input into the data processing apparatus 6.

In accordance with an example where a single source of light is provided to transfer the optical power to a segment of light, the length to width aspect ratio of the illuminated area covering the imaging area 12 can be in the range of about 10:1 to 60:1. For example, the strip-like illuminated area can measure about 600 mm×10 mm or multiples thereof. The imaging area can be narrower than the illuminated area.

The camera 11 is connected via a data connection to the data processing apparatus 6. The connection can be any suitable wired or at least partially wireless data connection, and data can be communicated from the camera based on any appropriate data communication protocol. The data processing apparatus 6 can comprise any suitable computer device, for example a server, configured to perform the monitoring, analysis and control functions required by process control. The data processing apparatus 6 can be connected to/be a part of wider data communications system, such as an Intranet or the Internet. The data processing apparatus can be configured for monitoring and control of a large scale production facility such as a factory or a food processing plant. For example, the data processing apparatus can be configured for food mills, various types of food processing applications, recycling plants, different raw material processing facilities and so on. Functions of the data processor apparatus can be at least in part provided in a cloud or virtualized environment. Appropriate gateways can be provided between different environments.

The data processing apparatus can comprise any appropriate computing arrangement comprising at least one processor, memory, software and internal circuitry and components necessary to perform the tasks configured to implement at least some of the herein described features. FIG. 1 shows an example of internal components of a data processing apparatus arranged on a board and comprising processor(s) and memory or memories, and connections between the elements of the apparatus and an interface for connecting the data processing apparatus to the camera. The at least one processor may be configured to execute an appropriate software code to implement one or more of the following aspects. The software code may be stored in the at least one memory.

The monitoring apparatus further comprises a colinear lighting unit comprising a source of light 15 and a reflector 14. The source of light 15 may comprise for example a single incandescent bulb. In another implementation multiple bulbs can be provided. The light source may also comprise at least one LED. Also, each detection module may have multiple lighting units each comprising a reflector and at least one bulb. Such arrangement may be desired, e.g., for a high-power application. The light of multiple lighting units can overlap or add up to form an even illumination across the imaging area.

The reflector is configured to have a concave shape such that it reflects light 16 emitted from the source of light 15 in three dimensions to provide uniform illumination across the imaging area 12. The reflector design can be based on freeform optics. Basic principles of the freeform optics will be explained later in this specification.

Lines 17 and 18 denote the extremes of the effective light rays emerging from the reflector 14 and reflected by the shaping thereof to the imaging area in a predefined manner. The plan view of FIG. 2 shows schematically how rays 20 are also reflected at the end 22 of the reflector 14 to the imaging area 12. As shown, the light energy is also utilised at the end by reflecting the light towards the imaging area and not allowing the rays to escape at the sides of the conveyor 2 and be wasted that way. In order to ensure the uniformity across the length of the imaging area 12, the reflector is shaped and the light distribution is optimised such that the optical energy is evenly distributed on the pixels across the line of sight of the camera. The provided illumination area can be configured to substantially match the imaging area 12.

Figure 3B:
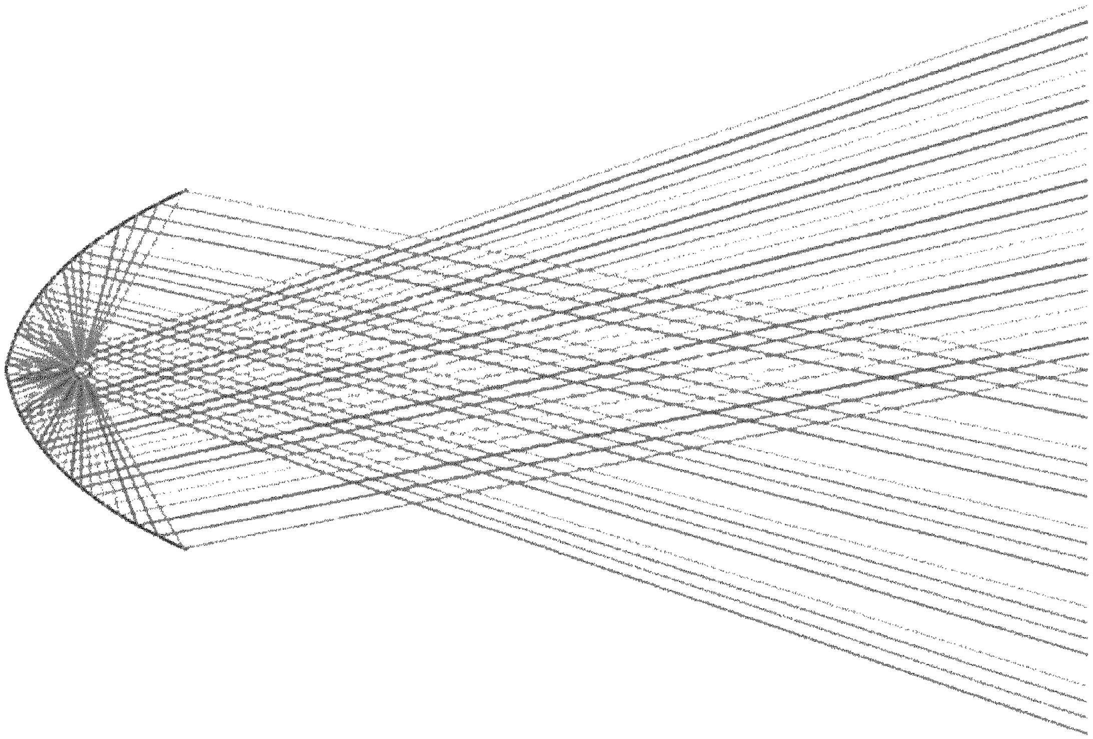
FIGS. 3A to 3D are schematic examples of reflection of light rays by a three dimensional reflector formed according to the herein disclosed principles.
Figure 3A:
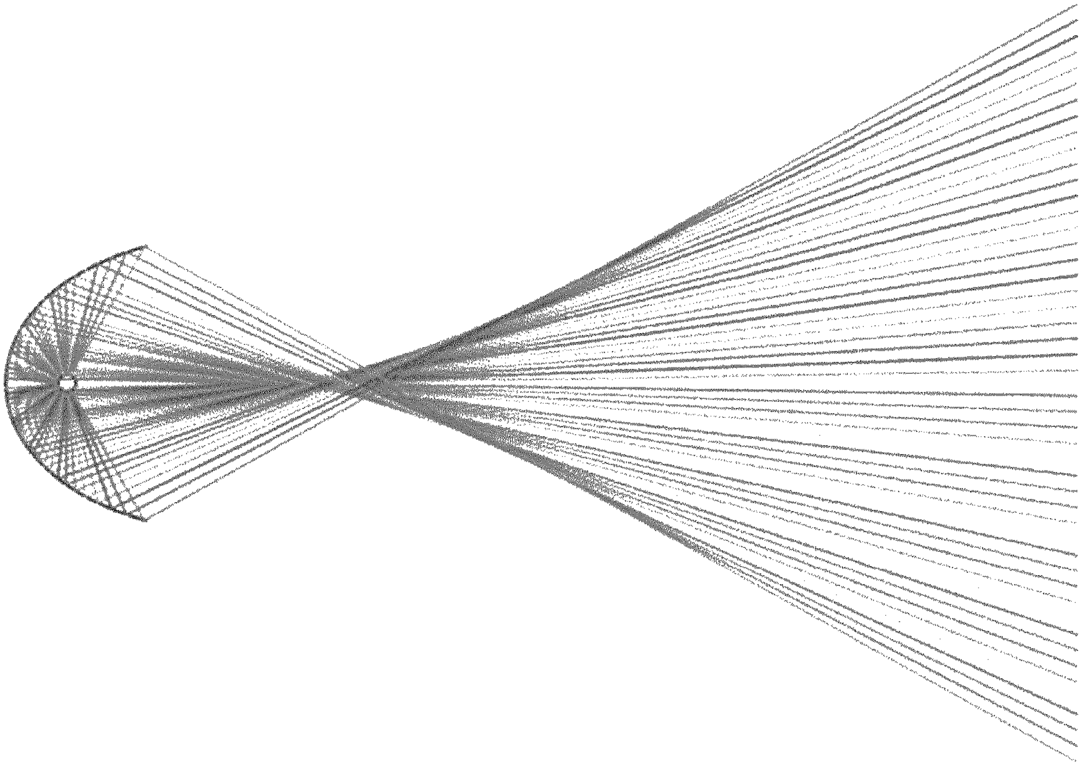
Figure 3D:
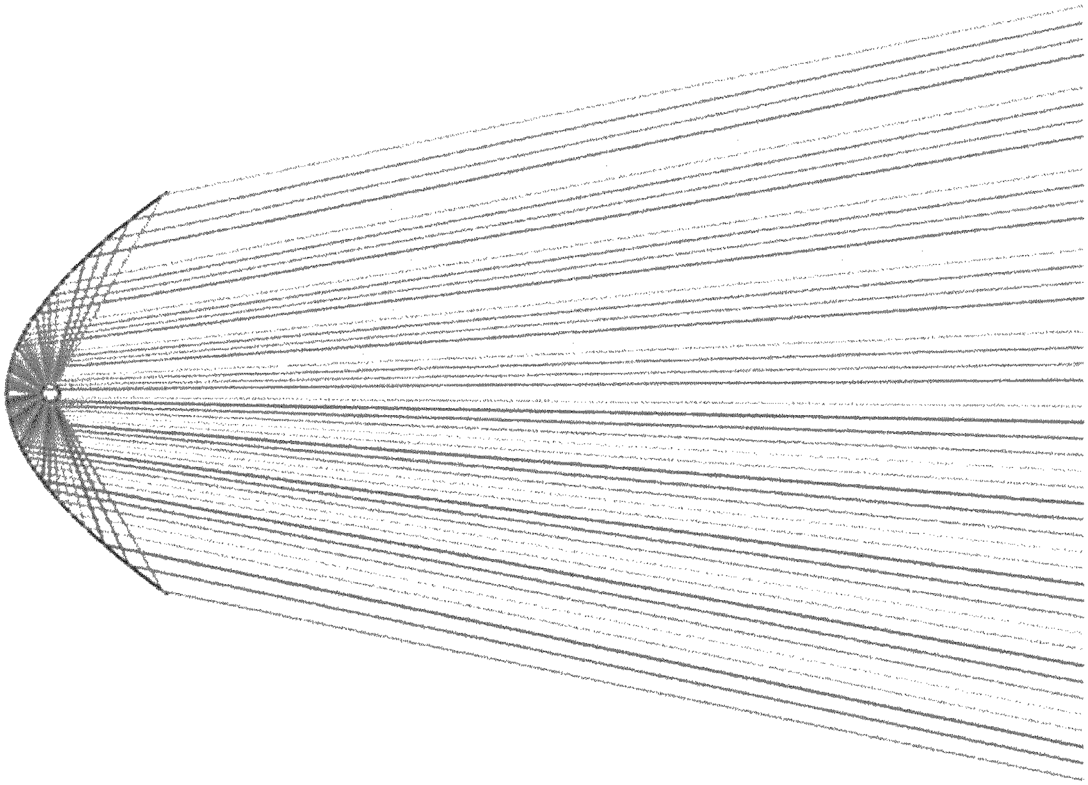
Figure 3C:
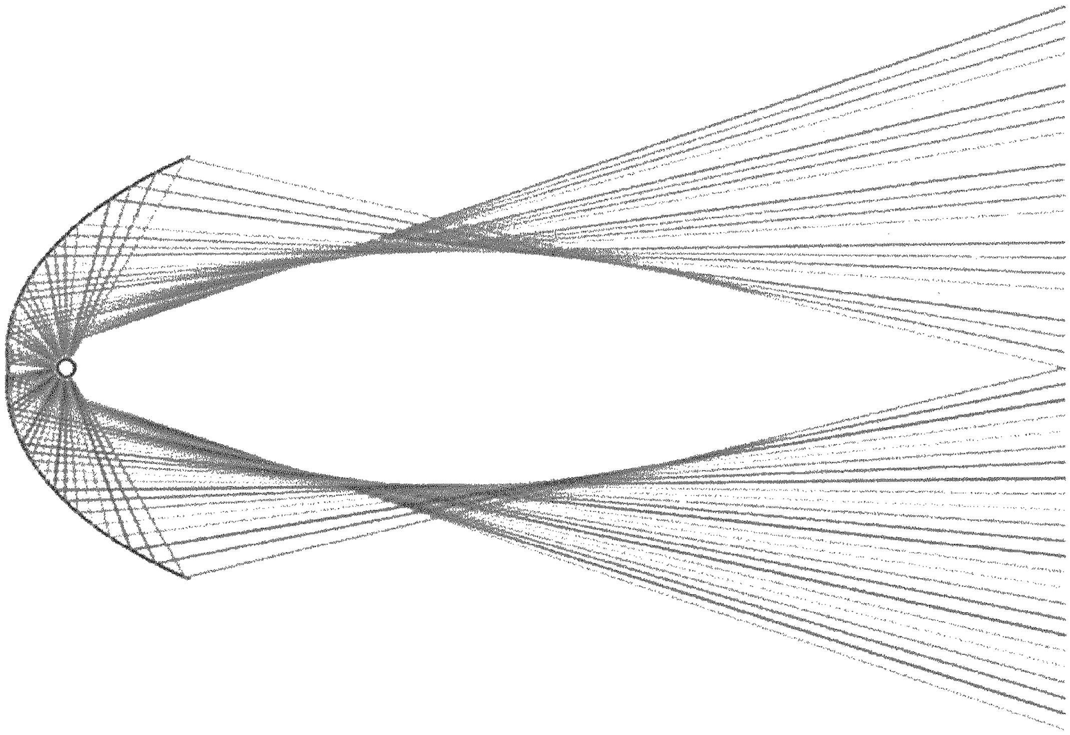

FIGS. 3A-3D are schematic side views showing non-limiting examples of different reflection scenarios. As shown, a reflector geometry can be shaped to generate different distribution of the rays. Regardless of the selected design, the aim is to generate uniform mapping of the light energy in the rays to the plane of the imaging area, i.e., the reflector in each case is designed such that the pixels on the imaging area receive uniform amount of light. In FIG. 3A crossed converging is provided whereas FIG. 3B shows crossed diverging. FIG. 3C shows uncrossed converging and FIG. 3D shows uncrossed diverging. Any of these can be used for implementing the herein described reflector designs.

By careful mapping a reflector design can be provided where there is no substantial variation in the amount of light received by each pixel across the imaging area whereby a good dynamic range of the optical system can be achieved.

The concave reflector shape prevents light rays 20 escaping at the end 22 of the reflector and be directed to the imaging area 12 in a desired manner. It is noted that the presentation is highly schematic and only a few rays 20 are shown as reflected at one end of the reflector to illustrate the principle. In real life implementations the light source can be positioned differently, e.g., outside the reflector dome and the light emitted from the light source 15 is distributed throughout volume of the reflector and reflected in three dimensions and uniformly across the imaging area 12.

Figure 4B:
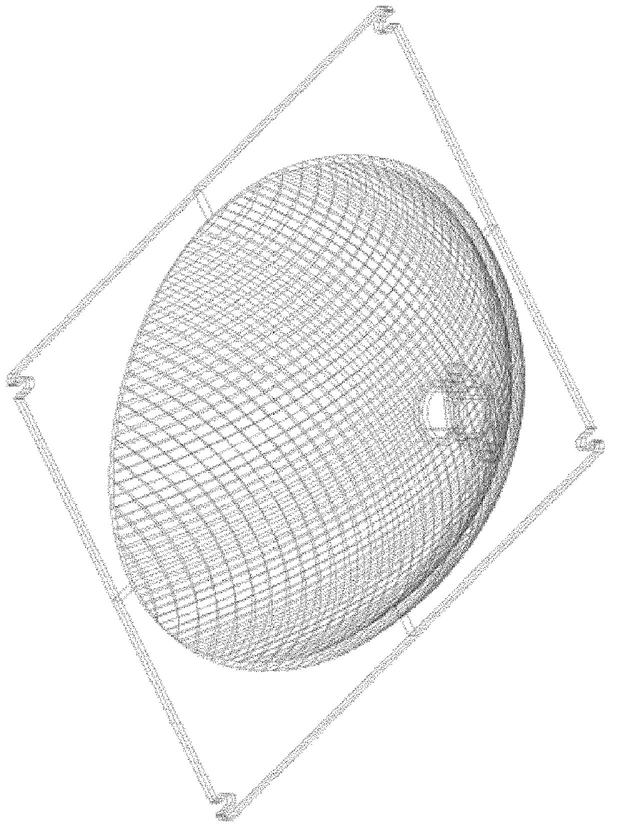
FIGS. 4A and 4B shows perspective views of a reflector in accordance with an example.
Figure 4A:
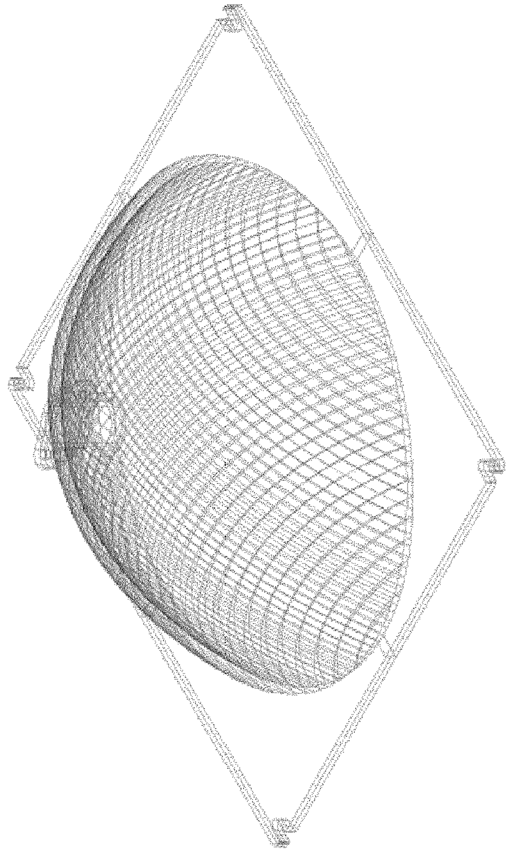

FIGS. 4A and 4B are perspective schematic views from the top and bottom of an example reflector with a three dimensionally (3D) reflecting internal volume. FIG. 4A shows the external shape and FIG. 4B the internal shape of the reflector. The shaping of the reflector can be tailored using appropriate optimisation tools and techniques to provide more accurate focusing of the light uniformly across the imaging area while preventing light escaping at the ends. The illumination on the imaging area is tailored such that the imaging device can provides an uniform response with maximum efficiency.

Figure 5:
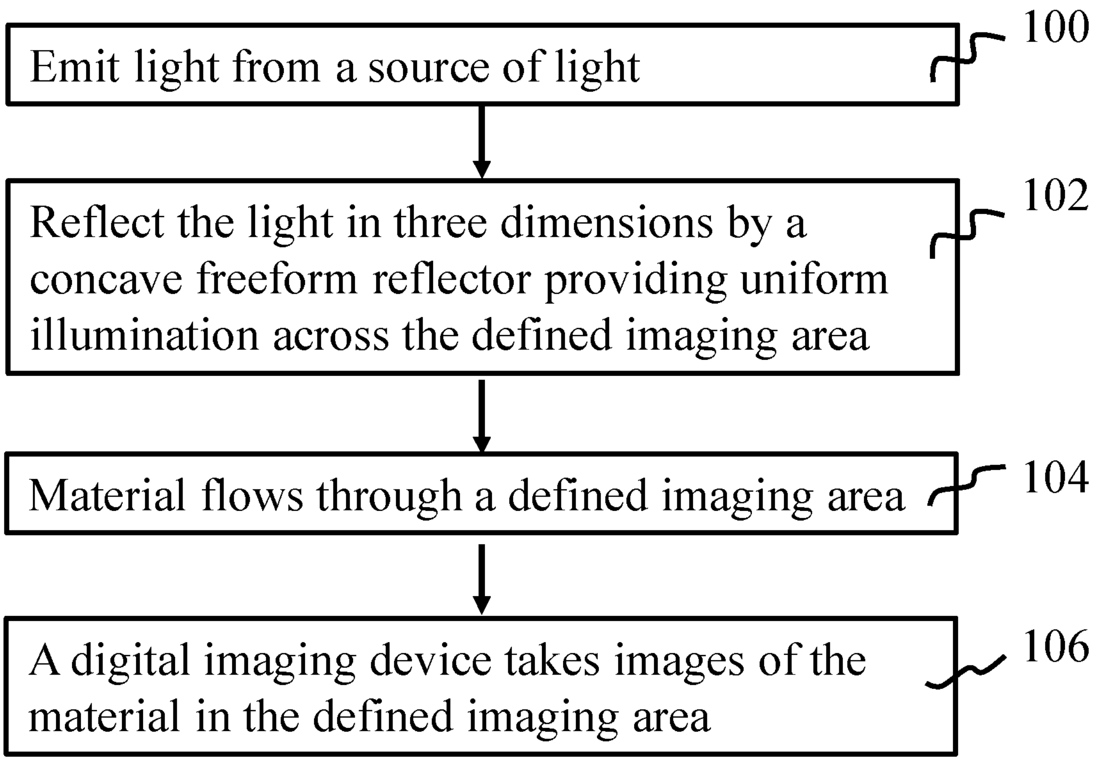
FIG. 5 shows a flowchart for operation according to an example.

FIG. 5 shows an example for using a three-dimensional (3D) reflector in a method for optical monitoring of material. In the method light is emitted from a source of light at 100 such that the emitted light is reflected in three dimensions at 102 by a colinear concave reflector to provide uniform illumination across the defined imaging area. The reflector is designed such that the pixels across the imaging area are provided substantially the same amount of light. Bulk material continuously flows through a defined imaging area at 104. An imaging device is used at 106 for imaging the material in the defined imaging area while light is reflected in three dimensions by the colinear concave reflector.

The following explains in more detail certain features and achievable benefits in the context of examples in relation to producing foreground lighting for an optical sorter with a colinear lighting arrangement. A three dimensional (3D) "freeform" shaped reflector mirror is provided such that the light is concentrated into a segment defined within an imaging area instead of a line. Use of the 3D reflector provides an increase in light efficiency and does not necessitate use of additional optical elements such as lenses. In certain application a threefold increase relative to a cylindrical reflector is found to be achievable. The 3D shape of the reflector mirror can be optimized in a way that the irradiance is the same at any point along the length of the viewing area for a camera. The illumination on the imaging area can be provided in smaller segments. In accordance with a possibility multiple lighting units comprising at least one light source and reflector each can be arranged to cover the length of the imaging area. By using a number of cooperative lighting units the total power can be increased while maintaining flat response across the area.

Figure 6:
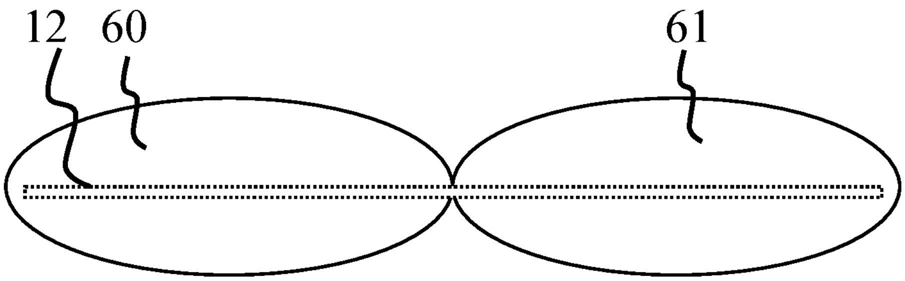
FIG. 6 shows an example of two cooperative lighting units.

FIG. 6 shows an example where two cooperative lighting units 60, 61 are provided to illuminate an imaging area 12. The concave reflectors of the two lighting units are shaped so that the sum of the illumination from the reflectors of the two lighting units produce uniform irradiance or uniform response of the camera. More than two cooperative lighting units can be provided.

Freeform or anamorphic reflector can be configured to provide tailored illumination to achieve better focus and control on the light. Flattened uniformity across the viewing area with a single light source such as a single halogen bulb can be provided. The reflector shapes isotropic emission of an extended size light source such as the halogen bulb and focuses the light into a concentrated, homogeneous segment shaped illuminated area. This increases the amount of light available in the viewing area of the camera, while reducing the overall energy used.

The concave shaped reflectors can be used in management of heat generated by high power foreground lighting. The freeform reflectors allow reduction in the number of light sources for the same final image plane irradiance compared to cylindrical 2D reflectors. Reduced heat may also avoid failures caused by excessive heat. Reducing the amount of heat generated can be important, e.g., for safety and product quality reasons. Reduction of heat generated by the lighting assembly and/or within the enclosure of the lighting unit is considered an important benefit.

A freeform 3-dimensional surface of the reflector to optimally have light in the position of interest can be designed using software aided optimisation. A half ellipsoid with appropriate length, width and height can be used as a starting point of an iterative process. Information of the imaging area, the location and position of the ellipsoid and the source of light can be used as input. A software aided optimisation algorithm can be run on a computer for iteratively forming the shape of the reflecting surface until a shape is found that achieves the desired uniform illumination across the imaging area. A CAD/CAM model can be created for the designed shape and a freeform reflector manufactured based on the model. Freeform optics constitutes a recent technology driving substantial changes in illumination design. Freeform surfaces can be understood as optical surfaces without linear or rotational symmetry. The freeform nature offers high degrees of design freedom, which can be used to avoid restrictions on reflector surface geometry and create efficient designs. Design of reflectors can be freed from restrictions of traditional optical surface geometry. Design methods of freeform illumination optics comprise zero-'etendue algorithms based on assumption of ideal source and design algorithms for extended light sources. The zero-'etendue algorithms include ray mapping methods, Monge-Ampézre equation method, and supporting quadric method (SQM). The algorithms for extended sources include illumination optimization, feedback design, and simultaneous multiple surfaces method. Use of freeform surfaces can produce new designs that cannot be achieved by the use of spherical or aspherical surfaces. The design of freeform illumination optics can be formulated as follows: given an input from a light source and an output from a reflector as a prescribed illumination, one or multiple freeform surfaces are to be designed so that the light rays emitted from the light source are redirected to produce the prescribed illumination on the target surface which is an inverse problem.

To give a more detailed example, a freeform reflector can be designed using the SQM method in an intuitive manner. A predefined illuminance distribution can be assumed to be a continuous function defined on a domain. The domain is pixelated and a sample point is defined for each pixel. The amount of energy assigned at each sample point can be considered equal to the total energy contained in its corresponding pixel. The prescribed illumination problem is converted into a discrete illumination problem after pixelation of the domain. The discrete illumination problem can then be solved. The light beam emitted from a light source S is considered to be reflected by the $i^{th}$ surface patch to converge to point Ti on the target plane on the imaging area. The $i^{th}$ surface patch is an ellipsoidal mirror, and the points S and Ti are the two foci of the ellipsoid. The total energy delivered by the $i^{th}$ surface patch is determined by the parameters of this ellipsoid. With a fixed focal length, it is possible to iteratively adjust the parameters of the ellipsoid (e.g., the length of the long axis) so that the total energy delivered by the $i^{th}$ surface patch to point Ti is equal to the prescribed value. For the discrete illumination problem, a set of ellipsoidal surface patches are computed and the number of the surface patches is equal to that of the sample points. The final freeform reflector is composed of these surface patches. The SQM method can also be used to find a ray mapping of the ray mapping method.

The above is an illustrative example and there are several possible design methods that can be used to achieve a desired freeform reflector design. More detailed description of these can be found from article by Wu, Rengmao, Zexin Feng, Zhenrong Zheng, Rongguang Liang, Pablo Benitez, Juan C. Minano, and Fabian Duerr 'Design of Freeform Illumination Optics'. Laser & Photonics Reviews 12, no. 7 (July 2018): 1700310.

The generation and optimisation of the shape of a freeform reflector can be done with the aid of a software product specifically configured for this purpose. A commercially available ray tracing software can be used to evaluate the performance of the design between iterations. Examples of such are commercially available software products such as Speos, Lightools, Tracepro, and Zemax FIG. 1 shows a single monitoring apparatus and a single camera. A monitoring system can comprise several monitoring apparatuses, lighting units and cameras and respective imaging areas. These all may be connected to the control system/data processing apparatus 6. Multiple high power lighting units may need to be positioned close to each other or at least in sight such that these may cause interference. This can be addressed by shaping the reflectors of the lighting units to tailor the illumination to illuminate only the relevant imaging area with a limited spatial extent. The reflected lighting can create a uniform illumination across the line of sight of the camera with sharp cut-off at each extremity so as to avoid crosstalk with adjacent monitoring modules. Cross talk can lead to limitations in equipment design and size, for example because of need of in-fill lighting. Tailoring of the shape of the freeform reflectors can be used to mitigate the effects of cross talk and/or control the cross talk such that the distribution of illumination is uniform and is seen flat by the imaging device. Use of interacting lighting units can also be used to reduce the overall size and complexity of the system architecture.

Figure 7A:
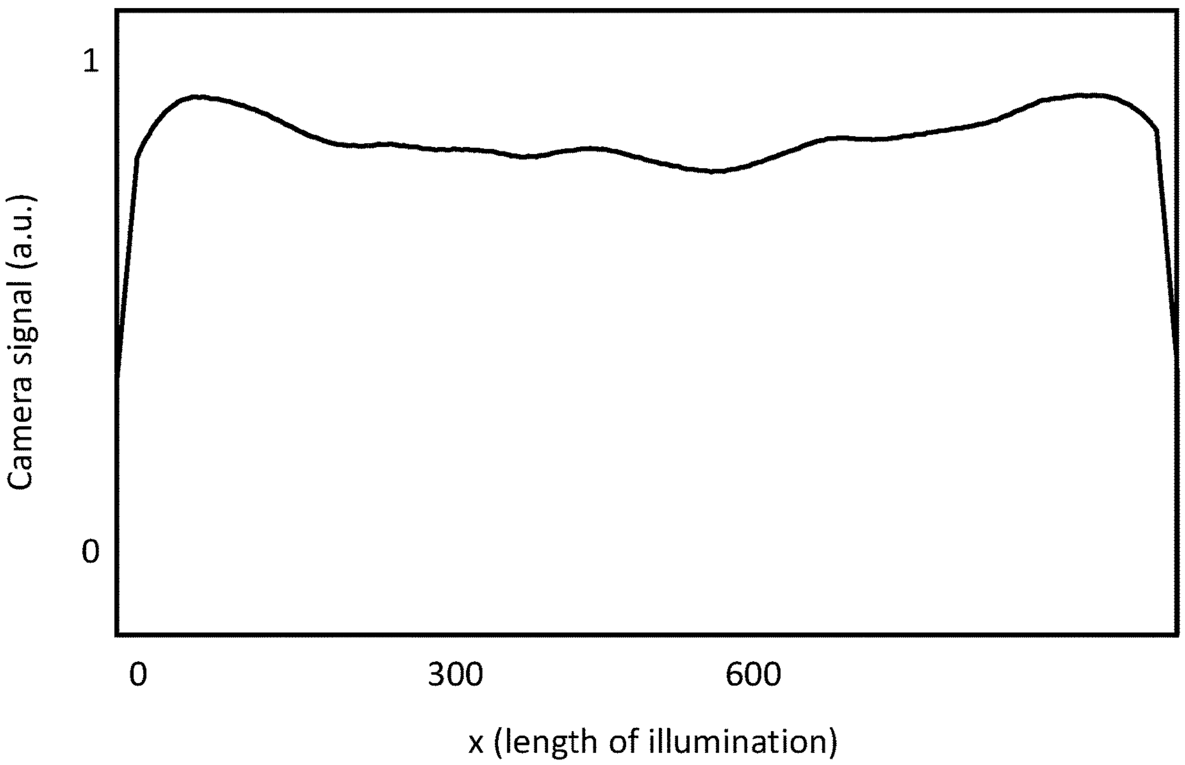
FIGS. 7A, 7B and 7C show results of comparative testing and simulations.

Comparative performance testing and simulations on reflectors have been performed between the herein disclosed freeform three dimensional (3D) reflector design and an existing cylindrical two dimensional (2D) design. The results of the testing are shown in FIG. 7A. Results of simulations are shown in FIGS. 7B and 7C.

FIG. 7A shows testing results for illumination length of 900 mm (x-axis) and the relative response on y-axis on the scale of 0 to 1. The tests showed a relatively uniform response across the width of the illumination area.

Figure 7B:
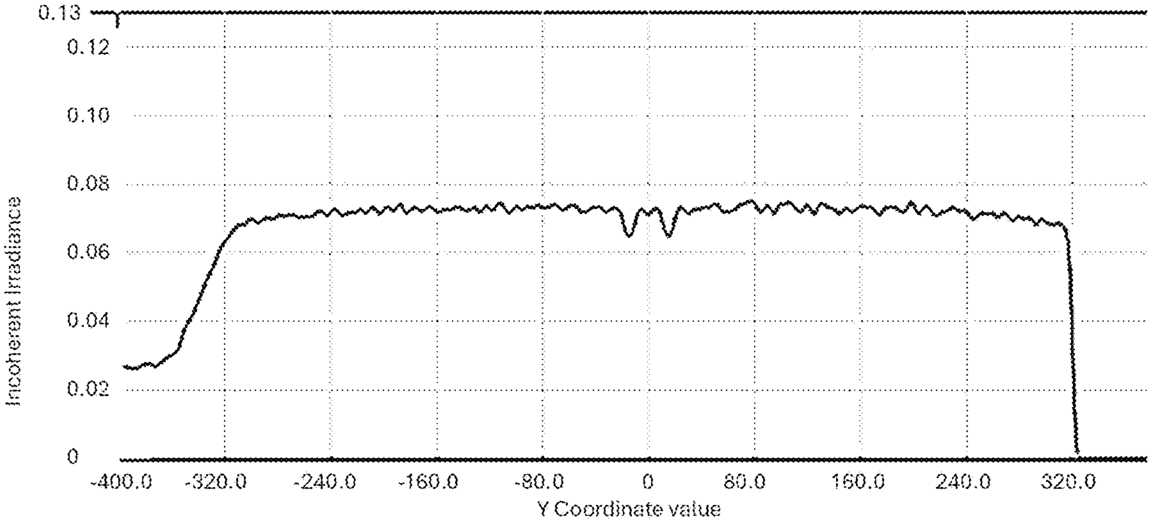
Figure 7C:
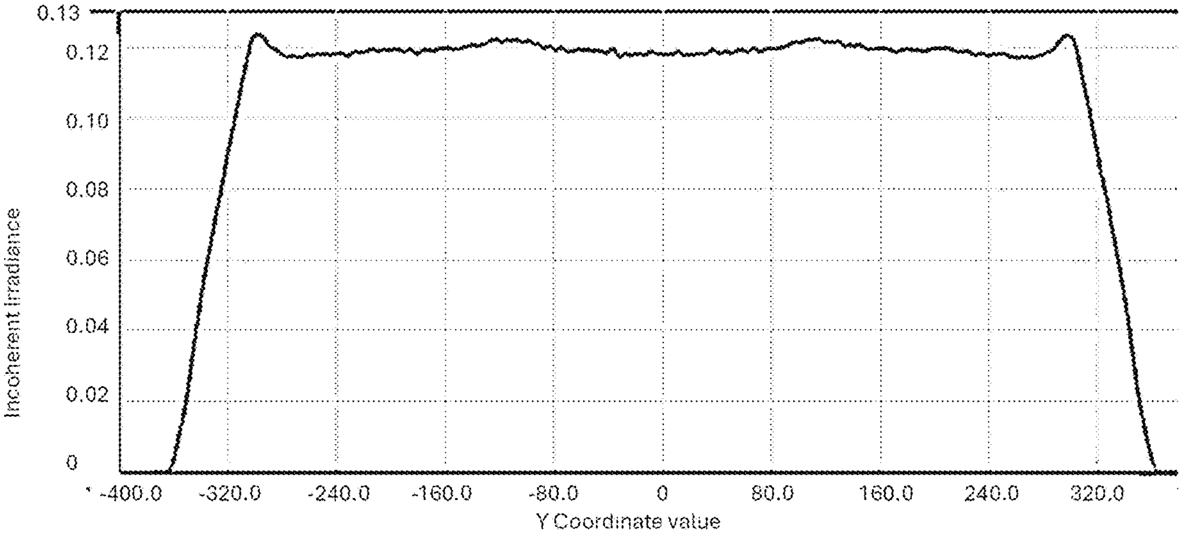

In FIGS. 7B and 7C the horizontal axis indicates the y-axis value across 600 mm length of the viewing area. The vertical axis indicates the determined incoherent irradiance.

FIG. 7B shows simulation results for a 2D design with 2×300 bulbs and where baffles were used. FIG. 7C shows the simulation results for 3D design with single 300 W bulb and no baffling. The drop-offs at edges of the 3D design are well defined while the left edge for the 2D design is not sharp, even with use of baffling. Also, the testing showed the irradiance efficiency for the 3D design to be higher despite only a single bulb being used. The testing and simulation results are consistent in indicating improvement on 2D reflectors.

The design of the reflectors provides increased optical power at the relevant region. Need for baffling can be reduced or removed all together. Controlled spatial brightness may be achieved. Heat may be reduced. Amount of stray light that could interfere with other vision systems may be reduced or even eliminated. Modularity may be provided as the lighting units can be tailored to be compatible for different sizes of machine and processes, without the need for infill, hence reducing the footprint of the machine. Better control of optical radiation can be used to mitigate optical safety issues. In general, improved homogeneity of the lighting across the viewing area may be provided, thus improving the accuracy of the imaging and the results of the analysis. Increase in the effective dynamic range of the detection was noted. Flattening illumination and compensation of the reduced sensitivity of the camera at high angle may be provided. Reduces cost, complexity and energy usage may be provided.

It is noted that although the above detailed examples have been described with reference to certain processes, applications and machines there are several variations and modifications which may be made to the disclosed solution without departing from the scope of the present invention. In particular, the different embodiments have been described as examples. Different features from different embodiments may be combined.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will fall within the scope of this invention.

The invention claimed is:

1. An optical monitoring apparatus, the apparatus comprising:

an imaging device for monitoring of material continuously moving through a defined imaging area, and a lighting unit comprising at least one source of light and a concave freeform reflector configured for reflection of light from the at least one source of light in three dimensions to provide uniform illumination across a plane of the defined imaging area.

2. The apparatus of claim 1, wherein the concave freeform reflector is shaped to reflect the illumination on the imaging area such that the imaging device provides uniform response with optimised efficiency.

3. The apparatus of claim 1, wherein the width of the illumination area is less or equal to 50 mm for an illumination distance in the range of 150 mm to 1200 mm and the length of the illumination area is in the range of 150 mm to 600 mm.

4. The apparatus of claim 1, wherein width to length ratio of the illumination area is about 1:10 to 1:60.

5. The apparatus of claim 1, wherein the concave reflector is shaped to provide a sharp cut-off of the illumination at each extremity of the imaging area.

6. The apparatus of claim 1 comprising at least two lighting units and associated imaging areas, wherein at least one concave reflector is shaped to control illumination crosstalk with an adjacent imaging area.

7. The apparatus of claim 1 comprising at least two lighting units per an imaging area, wherein the concave reflectors of the at least two lighting units are shaped so that the sum of the illumination from the reflectors of the at least two lighting units produce uniform irradiance or uniform response of the imaging device on the imaging area.

8. The apparatus of claim 1, configured for monitoring of bulk material moving through the defined imaging area.

9. The apparatus of claim 8, wherein the lighting is directed to material guided by a chute or a conveyor.

10. The apparatus of claim 8, wherein the material comprises at least one of food material, granular polymeric material, wooden material, bulk dry commodities, waste material and/or metallic material.

11. The apparatus of claim 1, comprising a sorting and/or analysing apparatus.

12. The apparatus of claim 11, configured to at least one of inspect, grade, separate, reject and produce a measurement and/or quality analysis of the material based on the imaging.

13. The apparatus of claim 1, wherein the source of light comprises at least one halogen light bulb and/or at least one LED.

14. A method for optical monitoring of material, the method comprising:

imaging material flowing through a defined imaging area by a digital imaging device;

emitting light from at least one source of light; and reflecting the light in three dimensions by a concave freeform reflector such that uniform illumination is provided across a plane of the defined imaging area and such that the imaging device provides uniform response across the imaging area.

15. The method of claim 14, comprising reflecting the light toward the defined imaging area such that a sharp cut-off of the illumination at each extremity of the imaging area is provided and/or illumination crosstalk with an adjacent imaging area is controlled and/or at least two lighting units provide a single uniform illumination area.

* * * * *